United States Patent
Fischer et al.

(10) Patent No.: US 9,858,786 B2
(45) Date of Patent: Jan. 2, 2018

(54) DANGER DETECTOR WITH A NON-CONTACT HEAT RADIATION SENSOR FOR ESTABLISHING AN AMBIENT TEMPERATURE

(71) Applicant: Siemens Schweiz AG, Zuerich (CH)

(72) Inventors: Martin Fischer, Buelach (CH); Claudio Foelmli, Lucerne (CH); Christian Liechti, Staefa (CH)

(73) Assignee: SIEMENS SCHWEIZ AG, Zuerich (CH)

( * ) Notice: Subject to any disclaimer, the term of this patent is extended or adjusted under 35 U.S.C. 154(b) by 0 days.

(21) Appl. No.: 14/768,129

(22) PCT Filed: Feb. 10, 2014

(86) PCT No.: PCT/EP2014/052513
§ 371 (c)(1),
(2) Date: Aug. 14, 2015

(87) PCT Pub. No.: WO2014/135336
PCT Pub. Date: Sep. 12, 2014

(65) Prior Publication Data
US 2015/0379847 A1     Dec. 31, 2015

(30) Foreign Application Priority Data
Mar. 6, 2013 (EP) .................... 13157939

(51) Int. Cl.
*G08B 17/12* (2006.01)
*G01J 5/08* (2006.01)
(Continued)

(52) U.S. Cl.
CPC ............ *G08B 17/12* (2013.01); *G01J 5/0014* (2013.01); *G01J 5/025* (2013.01); *G01J 5/041* (2013.01);
(Continued)

(58) Field of Classification Search
CPC ...................................... G08B 17/12
See application file for complete search history.

(56) References Cited

U.S. PATENT DOCUMENTS 5,153,563 A * 10/1992 Goto .......................... G01J 5/60
                                                                236/49.2
6,064,064 A *  5/2000 Castleman ............... 250/339.15
(Continued)

FOREIGN PATENT DOCUMENTS

CN    1961201 A      5/2007  ............... G01J 5/04
CN    201084247 Y    7/2008  ............. G08B 17/06
(Continued)

OTHER PUBLICATIONS

International Search Report, Application No. PCT/EP2014/052513, 3 pages, dated May 21, 2014.

*Primary Examiner* — David Porta
*Assistant Examiner* — Hugh H Maupin
(74) *Attorney, Agent, or Firm* — Slayden Grubert Beard PLLC

(57) ABSTRACT

A danger detector configured as a point detector includes an alarm housing with an alarm cover, a non-contact heat radiation sensor that is sensitive to heat radiation in the infrared range, and a treatment unit configured to determine and emit a temperature value derived from the detected heat radiation for the ambient temperature in the surroundings of the danger detector and/or an alarm, in the event that the currently determined temperature value exceeds a predetermined temperature comparison value. The heat radiation sensor is arranged in the alarm housing and is configured to optically detect the ambient temperature on the inner side of the alarm cover. The heat radiation sensor may be a thermopile designed as an SMD component.

19 Claims, 2 Drawing Sheets

(51) Int. Cl.
*G01J 5/60* (2006.01)
*G01J 5/00* (2006.01)
*G01J 5/02* (2006.01)
*G01J 5/12* (2006.01)
*G01J 5/20* (2006.01)
*G01J 5/04* (2006.01)
*G01J 5/58* (2006.01)

(52) U.S. Cl.
CPC ........... *G01J 5/0806* (2013.01); *G01J 5/0821* (2013.01); *G01J 5/0887* (2013.01); *G01J 5/12* (2013.01); *G01J 5/20* (2013.01); *G01J 5/58* (2013.01); *G01J 5/602* (2013.01)

(56) References Cited

U.S. PATENT DOCUMENTS

| | | | |
|---|---|---|---|
| 8,366,317 B2 | 2/2013 | Ernst et al. | 374/131 |
| 2003/0222218 A1 | 12/2003 | Nozu | 250/338.1 |
| 2004/0231399 A1* | 11/2004 | Gokhfeld | 73/23.31 |
| 2008/0230701 A1* | 9/2008 | Serero et al. | 250/339.15 |
| 2009/0206264 A1* | 8/2009 | Twiney | G01J 5/041 250/353 |
| 2012/0235038 A1* | 9/2012 | Nishikawa | G01J 5/0014 250/338.3 |
| 2012/0293334 A1* | 11/2012 | Yu | G08B 17/10 340/632 |
| 2012/0322140 A1* | 12/2012 | Shigeura | B01J 19/0093 435/289.1 |

FOREIGN PATENT DOCUMENTS

| | | | |
|---|---|---|---|
| CN | 101783056 A | 7/2010 | G01K 5/62 |
| CN | 101928579 A | 12/2010 | C10B 39/02 |
| EP | 0419046 A1 | 3/1991 | G01J 5/60 |
| WO | 86/00179 A1 | 1/1986 | F24C 7/04 |
| WO | 2005/121727 A1 | 12/2005 | G01J 5/04 |
| WO | 2014/135336 A1 | 9/2014 | G01J 5/00 |

\* cited by examiner

DANGER DETECTOR WITH A NON-CONTACT HEAT RADIATION SENSOR FOR ESTABLISHING AN AMBIENT TEMPERATURE

CROSS-REFERENCE TO RELATED APPLICATIONS

This application is a U.S. National Stage Application of International Application No. PCT/EP2014/052513 filed Feb. 10, 2014, which designates the United States of America, and claims priority to EP Application No. 13157939.3 filed Mar. 6, 2013, the contents of which are hereby incorporated by reference in their entirety.

TECHNICAL FIELD

The present invention relates to danger detectors, and more particularly, to danger detectors configured to detect an ambient temperature and generated a related output.

BACKGROUND

With known danger detectors the temperature sensor, typically an NTC resistor, is typically attached to the detector vertex, in order to detect the ambient temperature of the danger detector itself as independently of direction as possible.

A serious problem in such detectors is also that the ambient temperature is only detected in point form by means of the NTC resistor. This requires a very precise mechanical positioning. Investigations in this area have shown that even deviations of less than 1 mm from the vertex point, meaning from the geometrically central position, can lead to significant directional dependencies. In addition it is disadvantageously necessary for the NTC resistor to be mechanically protected from the environment, e.g. by means of a separate dome or a cover.

A further problem is that the electrical connection of the NTC resistor to a corresponding evaluation unit, which is located on a circuit carrier of the danger detector, is made through a connecting line, which mostly leads through the optically-sensitive space of the alarm housing and through the measurement chamber for smoke detection located therein to the evaluation unit. This leads to complex constructions in respect of the measuring chamber and makes the installation of the danger detector more difficult. In addition optical scattering at the pass-through of the connecting line is disadvantageously possible.

Disposing two or more temperature sensors, e.g., opposite one another, on the outer circumference of the danger detector is also known. However disadvantageously additional components are necessary. Also the additional effort for the installation and the electronic measurement evaluation is immense.

SUMMARY

Embodiments of the invention specify a danger detector with a more simple temperature detection than conventional detectors, and corresponding methods for determining an ambient temperature in the environment of a danger detector.

One embodiment provides a danger detector embodied as a point-type detector, comprising an alarm housing with an alarm cover, a non-contact heat radiation sensor sensitive to heat radiation in the infrared range, as well as a processing unit at least for determining and outputting a temperature value for an ambient temperature derived from the detected heat radiation in the environment of the danger detector and/or a message if the current determined temperature value exceeds a predetermined temperature comparison value, wherein the heat radiation sensor is disposed in the alarm housing and is aligned optically, for acquisition of the ambient temperature, to the inner side of the alarm cover.

In a further embodiment, the inner side of the alarm cover is able to be used as a measurement surface for non-contact acquisition of the heat radiation and wherein the measurement surface lies optically in an acquisition area of the heat radiation sensor.

In a further embodiment, the measurement surface is provided at a central position, especially in the middle on the inner side of the alarm cover for largely direction-independent acquisition of the ambient temperature.

In a further embodiment, the inner side of the alarm cover at least approximately in the area of the usable measurement surface, has a treated or untreated material with a predetermined surface property and/or a material with a coating with a degree of emission for the heat radiation in the infrared range of the measurement surface of at least 0.75, e.g., at least 0.9.

In a further embodiment, the processing unit is configured for computational determination and derivation of the temperature value from a sensor signal output by the heat radiation sensor and from a stored value for the degree of emission of the measurement surface.

In a further embodiment, the danger detector has two non-contact heat radiation sensors sensitive for heat radiation in the infrared range and also the processing unit, wherein the two heat radiation sensors have different spectral heat radiation sensitivities and wherein the processing unit is configured for determining the temperature value on the basis of a ratio pyrometry.

In a further embodiment, the danger detector has one non-contact heat radiation sensor sensitive for heat radiation in the infrared range as well as the processing unit, wherein a switchable optical filter for two different spectral heat radiation sensitivities is connected upstream of the heat radiation sensor, and wherein the processing unit is configured for determining the temperature value on the basis of a ratio pyrometry.

In a further embodiment, the heat radiation sensor or sensors and the processing unit are combined into one component as a non-contact temperature sensor.

In a further embodiment, an alarm cover part approximately corresponding in terms of surface to the measurement surface is reduced in its thickness by comparison with a remaining part of the alarm cover and/or is largely thermally decoupled from the remaining part.

In a further embodiment, the respective heat radiation sensor has a heat radiation-sensitive sensor surface and wherein an optical lens and/or an optical fiber is disposed between the or both sensor surfaces on the one side and the inner side of the alarm cover provided for the detection of the ambient temperature on the other side, and the lens and the optical fiber are transparent for light in the mid-infrared range.

In a further embodiment, the respective heat radiation sensor comprises a thermopile or a bolometer.

In a further embodiment, a gas sensor for fire flue gases is accommodated in the danger detector and wherein at least one entry opening for the fire flue gases to be detected is disposed in the alarm housing.

In a further embodiment, the danger detector includes a scattered light arrangement disposed in or on the alarm housing for detection of smoke particles.

Another embodiment provides a method for determining a temperature value in the environment of a danger detector embodied as a point-type detector, wherein a heat radiation emitted from an inner side of an alarm cover is acquired as a sensor signal in a non-contact manner by means of a heat radiation sensor sensitive for said radiation, especially by means of a thermopile or a bolometer and wherein a temperature value for the environment of the danger detector is determined and output computationally from the sensor signal, taking into account a degree of emission for the heat radiation dependent on the material and/or on the surface property of the inner side of the alarm cover.

Another embodiment provides a method for determining a temperature value in the environment of a danger detector embodied as a point-type detector, wherein a heat radiation emitted by an inner side of an alarm cover is acquired in a non-contact manner by means of two heat radiation sensors sensitive for said radiation, especially by means of two thermopiles or two bolometers, as sensor signals in each case, wherein the two heat radiation sensors have different spectral heat radiation sensitivities and wherein the temperature value for the environment of the danger detector is determined and output from the two sensors signals on the basis of a ratio pyrometry.

BRIEF DESCRIPTION OF THE DRAWINGS

Example embodiments of the invention are explained below with reference to the figures, in which.

DETAILED DESCRIPTION

Figure 1:
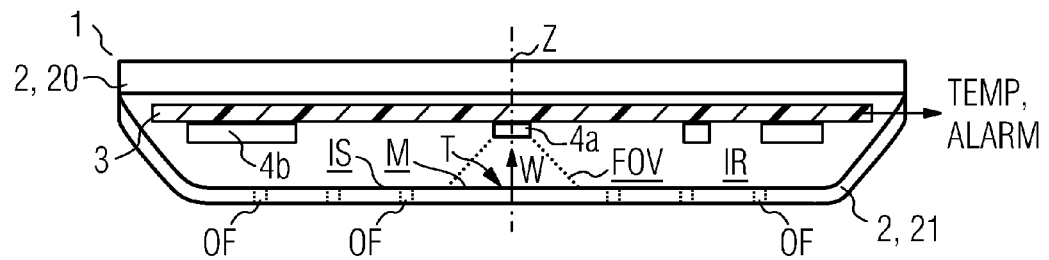
FIG. 1 shows an example of a danger detector embodied as a point-type detector according to certain embodiments.

Embodiments of the invention relate to a danger detector embodied as a point-type detector, e.g., a fire alarm, smoke alarm or flue gas alarm, which comprises an alarm housing with an alarm cover, a non-contact heat radiation sensor sensitive for heat radiation in the infrared range and also a downstream processing unit and computer-readable instructions stored in non-transitory memory and executable by the processing unit. Infrared range here especially means the long wave range from 2 µm to 50 µm, which is also referred to as mid-infrared, abbreviated as MIR.

The computer instructions and processing unit may be configured for further processing of a sensor signal output by the heat radiation sensor. The heat radiation sensor preferably has a themopile or a bolometer. The term thermopile is used more generally. Both the thermopile and also the bolometer typically each have a (single) sensor layer sensitive to heat radiation. They are especially non-imaging, i.e. they do not have a matrix consisting of a plurality of heat radiation-sensitive "pixels", such as for example a matrix of 16 times 16 or 32 times 32 "pixels". In this sense the heat radiation sensor is considered only to have a single "pixel".

Other embodiments provide methods for determining a temperature value in the environment of a danger detector embodied as a point-type detector.

The disclosed danger detectors, embodied as point-type danger detectors, may be configured to acquire an ambient temperature, in order for example to detect heat arising in a conflagration or fire. In addition the danger detector can be embodied as a fire detector, smoke detector or flue gas detector.

In the case of an optical smoke detector said detectors can have one or more scattered light arrangements disposed in the alarm housing for detection of smoke particles. The optical smoke detector in this case can be embodied as an open smoke detector, in which the detection space lies outside the alarm housing. It can also have a closed measurement chamber disposed in the alarm housing for the smoke detection. Such an optical measurement chamber is also called a labyrinth, which on the one hand is shielded from outside light by optical panels, but on the other hand is permeable for smoke particles to be detected. For this purpose the alarm housing has at least one entry opening for the possible entry of smoke particles into the optical measurement chamber.

As an alternative or in addition a gas sensor for detection of fire flue gases such as CO or $NO_x$ can be accommodated in the danger detector. For this purpose at least one entry opening for the fire flue gases to be detected is disposed in the housing. As an alternative or in addition the danger detector can have a detector unit operating according to the optical extinction method and/or according to the acousto-optical principle.

By taking into consideration different characteristic fire variables, such as e.g. the ambient temperature together with a gas concentration value typical of fire and/or with an optically detected smoke particle concentration value, more precise analyses and plausibility checks by the processing unit are possible. The output of false alarms is reduced by means of such a multi-criteria evaluation.

The disclosed danger detectors can be connected via a common detector line, especially via a two-wire line for exchange of signals and data, to a danger detector center or to a fire alarm center. A number of such danger detectors can be connected in detector groups or detector lines to such a danger detection center via which typically the danger detectors are also supplied with electrical power. As an alternative or in addition the danger detectors can be embodied "wirelessly". In this case said detectors preferably communicate via radio with the danger detector center or with further danger detectors.

According to some embodiments a danger detector embodied as a point-type detector has an alarm housing with an alarm cover, a non-contact heat radiation sensor sensitive for heat radiation in the infrared range as well as a processing unit, at least for determining and outputting a temperature value for an ambient temperature in the environment of the danger detector derived from the detected heat radiation and/or a message if the current determined temperature value exceeds a predetermined temperature comparison value. The heat radiation sensor is disposed in the alarm housing and, for acquiring the ambient temperature, is optically aligned to the inner side of the alarm cover.

A key aspect of the invention lies in the knowledge that the detector, when installed on a ceiling according to specifications, usually heats up most quickly, as during a fire for example, and that this large "sensor surface" by comparison with an NTC resistor can be employed for determining the temperature from the protected inner side of the alarm cover.

Through the non-contact acquisition by means of a heat radiation sensor of the heat radiation emitted by the inner side of the alarm cover, electrical wiring, which is expensive and susceptible to EMC, running through to a processing unit for the detection and evaluation of the temperature is also advantageously omitted. Usually such a processing unit is disposed on a circuit carrier in the danger detector.

The aforementioned message can e.g. be an alarm message, if a temperature value of e.g. 65° C. is exceeded. The message can be output over wires or wirelessly to a danger detection center or also optically and/or acoustically directly at the danger detector.

It may be advantageous for the heat radiation sensor to be disposed as an SMC component on this circuit carrier. Compared to a manual installation of the NTC resistor required for this purpose, this may be dispensed with here. In addition, an automated SMD installation is significantly cheaper and more exact.

The alarm housing and also the alarm cover, which can also be referred to as the alarm lid or the alarm covering, as is also the case with conventional fire detectors, are embodied light-tight. They are formed from a material impermeable to light, such as a white plastic for example. Alarm housing and alarm cover typically form one component in such cases, especially a one-piece injection-molded plastic part.

According to one embodiment the inner side of the alarm cover is able to be used as a measurement surface for non-contact acquisition of the heat radiation. The measurement surface lies optically in an acquisition area of the heat radiation sensor. By comparison with a more point-type temperature acquisition with an NTC resistor, this enables a larger surface to be acquired. By comparison with conventional installation with an NTC resistor, installation and component tolerances are advantageously far less critical.

According to one embodiment the housing part is located, for largely direction-independent detection of the ambient temperature, at a central position, especially in the middle on the inner side of the alarm cover. The measurement surface lies on the opposing side of the detector vertex, so to speak. Since the alarm cover heats up similarly quickly from each direction, the central arrangement enables a far lower directional dependency to be achieved in thermal response behavior.

According to a further embodiment the inner side of the alarm cover, at least approximately in the area of the usable measurement surface, has a treated or untreated material with a predetermined surface property. As an alternative or in addition the inner side can have a coating with a degree of emission for heat radiation in the infrared range of the measurement surface of at least 0.75, e.g., at least 0.9

Through the higher heat emission caused thereby, a better measurement evaluation with higher accuracy is possible at the same temperature. "Treated" means here that the surface of the material used is polished or keyed for example. The coating is preferably a layer of black color applied at least in the area of the measurement surface. The coating can also be a black adhesive or a black adhesive point which at least has the geometrical dimensions of the measurement surface.

According to one embodiment the processing unit is configured to execute a computer program or other instructions stored in non-transitory computer-readable media to for computationally determine and derive the temperature value from a sensor signal output by the heat radiation sensor and from a stored value for the degree of emission of the measurement surface. The computing effort required for this can advantageously also be done by a processing unit also intended for control and evaluation of the danger detector.

The computational determination of the temperature value is generally known according to the pyrometric measurement principle. The degree of emission required for this can e.g. be determined using measurement techniques as part of sample testing. The determined value can then be stored electronically in the processing unit or loaded from a non-volatile semiconductor memory connected thereto. The processing unit is preferably a microcontroller. Such a microcontroller then has the necessary computing steps for computational determination and derivation of the temperature value from a current value of the sensor signal and from the stored emission value. The microcontroller can also be an A/D converter for converting the sensor signal output by the heat emission sensor into a corresponding digital value. Preferably the microcontroller is configured to take over a large part or all the control and evaluation tasks of the danger detection, through to alarm output.

As an alternative thereto the danger detector can also comprise two non-contact heat radiation sensors sensitive for heat radiation in the infrared range with different spectral heat radiation sensitivities from one another as well as the processing unit. The processing unit in this case is configured for determining the temperature value on the basis of a ratio pyrometry. The temperature value is then able to be determined uniquely from the ratio of two detected sensor signal values. Through the evaluation of the ratio of two sensor signals for two different wave length ranges the taking into account of the degree of emission of the measurement surface is not necessary. In this case the microcontroller can e.g. have two A/D converters for converting the two sensor signals output by the heat radiation sensors into a corresponding digital value in each case.

As an alternative thereto the danger detector can also have (only) one non-contact heat radiation sensor sensitive for heat radiation in the infrared range and also the processing unit. Connected upstream from the heat radiation sensor is a switchable optical filter for two different spectral heat radiation sensitivities. The processing unit is configured for determining the temperature value based on a ratio pyrometry. The optical filter can be an electrically activatable optical filter. The electrical activation for switching over the spectral heat radiation sensitivity and the evaluation of the sensor signal corresponding thereto is preferably done by the processing unit.

It may be advantageous if the heat radiation sensor or sensors and the processing unit are combined into one component as a non-contact temperature sensor. The expense involved in development, components and installation is advantageously reduced by this.

According to one embodiment an alarm cover part approximately corresponding in terms of surface to the measurement surface is reduced in its thickness by comparison with a remaining part of the alarm cover. This reduces the thermal heat capacity in the area of the measurement surface. Thermal changes are advantageously able to be detected more quickly. As an alternative or in addition the alarm cover part can be largely thermally decoupled from the remaining part, such as e.g. via tabs remaining between the alarm cover part and the remaining part with intermediate slot openings. The latter can advantageously be used as entry openings for an internal optical measurement chamber and/or for an internal gas sensor for fire flue gases. Through the thermal decoupling an otherwise compensatory disadvantageous heat flow from the alarm cover part to the remaining part and vice versa is largely suppressed. "Largely" means a value for the thermal decoupling in the range of at least 80%.

According to a further embodiment the respective heat radiation sensor has a heat radiation-sensitive sensor surface. An optical lens is disposed between the sensor surface or both sensor surfaces on the one side and the inner side of the alarm cover designed for capturing the ambient temperature on the other side, wherein the lens is transparent for light in the mid-infrared range. This enables a measurement surface with predetermined geometrical dimensions, such as e.g. with a diameter of 2 cm or an edge length of around 2 cm×2 cm, to be focused approximately onto the sensor surface of the heat radiation sensor. In this case the heat radiation sensor is disposed on the circuit carrier opposite the measurement surface or the alarm cover part, preferably at a central mid position of the danger detector. In the case of two heat radiation sensors these are preferably arranged adjacent to one another.

As an alternative or in addition an optical waveguide is disposed between the or both sensor surfaces on the one side and the inner side of the alarm cover designed for acquisition of the ambient temperature on the other side. The optical waveguide is transparent for light in the mid-infrared range. In this case the heat radiation sensor can be disposed on an outer edge on the circuit carrier or in a non-critical area in the event of an optical measurement chamber for smoke particles being present. Conversely the measurement surface can continue to remain at the central position on the inner side of the alarm cover. In this case too the heat radiation sensor or sensors and the inner side of the alarm cover at the central position lie optically opposite one another. This is because the heat radiation coupled by the measurement surface into the optical waveguide runs via a number of total reflections in the optical waveguide for coupling out on the sensor surface of the heat radiation sensor. This advantageously enables the inner space of the alarm housing to be kept free, such as to accept an optical measuring chamber for example. Optically disruptive components, such as connection lines routed through the measurement chamber for example, can advantageously be dispensed with. In addition the installation is significantly simplified.

Such a material for the optical lens and for the optical waveguide can for example be a plastic such as a thermoplastic based on polymethylmethacrylate or polycarbonate, a glass, such as quartz glass, or a ceramic, such as transparent fine-crystalline spinel ceramics based on magnesium and aluminum oxide.

According to one embodiment the respective heat radiation sensor has a thermopile or a bolometer. Compared to a sensor based on the pyroelectric effect, which because of physical conditions is only capable of detecting dynamic changes of a hot object, thermopiles and also bolometers are capable of detecting static and also dynamic heat differences.

An example for a thermopile obtainable as an SMD component is e.g. the "Infrared Thermopile Sensor TMP006" from Texas Instruments, with housing dimensions of 1.6 mm×1.6 mm. This component also has a digital data interface for output of an already digital sensor signal for possible further processing by a microcontroller or microprocessor. In the associated "User's Guide", May 2011 Edition, mathematical equations are specified for computationally determining a temperature value from a given degree of emission, from a sensor voltage corresponding to the sensor signal and from further parameters such as chip temperature and calibration factor. These equations can be then computationally resolved by means of suitable software routines on a downstream microcontroller.

According to a further embodiment a gas sensor for fire flue gases is accommodated in the danger detector. At least one entry opening for the fire flue gases to be detected is disposed in the housing. As an alternative or in addition a scattered light arrangement for detection of smoke particles can be disposed in the danger detector in or on the alarm housing. This means that further characteristic fire variables for a more reliable danger evaluation are available. These can be logically combined in a suitable way into an algorithm in the sense of a multi-criteria evaluation.

Other embodiments provide a method for determining the temperature value in the environment of a danger detector embodied as a point-type detector, wherein heat radiation emitted from an inner side of an alarm cover is acquired in a non-contact manner by means of a heat radiation sensor sensitive thereto, especially by means of a thermopile or a bolometer, as a sensor signal. The temperature value for the environment of the danger detector is computationally determined and output in such cases from the sensor signal in pyrometric ways.

In particular the temperature value is determined and output from the sensor signal, taking into consideration a degree of emission for the heat radiation dependent on the material and/or on the surface property of the inner side of the alarm cover.

As an alternative to this the heat radiation can be acquired in a non-contact manner by means of two heat radiation sensors sensitive thereto as a sensor signal in each case, wherein the two heat radiation sensors have different spectral heat radiation sensitivities. In this case the temperature value for the environment of the danger detector is determined and output from the two sensors signals on the basis of a ratio pyrometry. In this case the comparatively complex computational determination of the temperature value on the basis of the degree of emission is dispensed with.

As an alternative to this the heat radiation can be acquired in a non-contact manner by means of (only) one heat radiation sensor sensitive thereto as a sensor signal, wherein a switchable optical filter for two different spectral heat radiation sensitivities is connected upstream of the heat radiation sensor. Then the temperature value for the environment of the danger detector is determined and output from the sensor signal according to the respective currently set spectral heat radiation sensitivity on the basis of a ratio pyrometry. The switchover preferably occurs cyclically.

FIG. 1 shows an example of a danger detector 1 embodied as a point-type detector, according to an embodiment. An alarm housing is labeled with the reference character 2, which includes components such as an alarm cover labeled 21. The alarm cover can also be called the detector lid, covering or cap. An axis of symmetry of the alarm housing 2 typically embodied rotation symmetrical is also indicated (cf. FIG. 4), which thus represents a central area Z for the danger detector 1. The inner side of the alarm cover 21 is also labeled IS. In the alarm cover 21, as shown by dashed lines, entry openings OF can also be present in order e.g. to make possible the entry of flue gases into the housing interior IR as well as their detection by means of a gas sensor present there, not shown in any greater detail. A detector base, for releasably accepting the danger detector 1, preferably on a ceiling, is labeled with the reference character 20. Accommodated in the danger detector 1 is a circuit carrier 3, such as e.g. a printed circuit board. A number of components such as resistors, capacitors and semiconductor components are typically disposed on this circuit carrier 3. For reasons of clarity a more detailed drawing has been dispensed with.

However a non-contact heat radiation sensor 4a, sensitive to heat radiation W in the infrared range labeled with the reference character 4a as well as a downstream processing unit 4b according to the invention are shown. The latter is at least intended or configured for determining or outputting a temperature value TEMP derived from the detected heat radiation W for the ambient temperature T in the environment of the danger detector 1. The processing unit 4b, according to the invention, can also be configured as an alternative or in addition, as indicated by an arrow in the present example, to output a message ALARM if the current determined temperature value TEMP exceeds a predetermined temperature comparison value. Furthermore according to the invention the heat radiation sensor 4a has a thermopile designed as an SMD component. It is preferably sensitive to infrared light in the wavelength range from 2 µm to 50 µm, especially from 3 µm to 20 µm.

The heat radiation sensor 4a disposed in the alarm housing 2 is also optically aligned, according to the invention, onto the inner side IS of the alarm cover 21 for acquiring the ambient temperature T. In this case the temperature T on the inner side IS of the alarm cover 21 follows the actual temperature with a slight, acceptable delay, above all in the flow-relevant central area Z on the outer side of the alarm cover 21. Furthermore, according to the invention, the inner side IS of the alarm cover 21 is able to be used as a measurement surface M for non-contact acquisition of the heat radiation W. The measurement surface M in this case lies optically in an acquisition area FOV of the heat radiation sensor 4a. In particular the measurement surface M shown is provided at a central position Z, i.e. in the middle on the inner side IS of the alarm cover 21 for largely direction-independent acquisition of the ambient temperature T. According to the invention the processing unit 4b is also configured for computational determination and derivation of the temperature value TEMP from a sensor signal output by the heat radiation sensor 4a and from a stored value for the degree of emission of the measurement surface M. The degree of emission in this case is dependent on the surface property as well as the material in the area of the measurement surface M.

Figure 2:
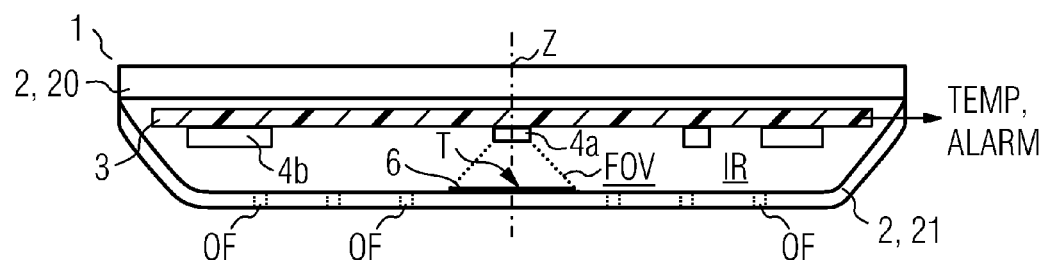
FIG. 2 shows an example of a danger detector according to a first embodiment.

FIG. 2 shows an example of a danger detector 1 according to a first embodiment. In this case the inner side IS of the alarm cover 21, at least approximately in the area of the usable measurement surface M, has a coating 6 with a degree of emission for the heat radiation in the infrared range of the measurement surface M of at least 0.75, preferably of at least 0.9. A color can also be applied in this area such as for example the Velvet Superblack paint from 3M, which in fact has a degree of emission of 1.0.

As an alternative the danger detector 1 according to the invention can also have two non-contact heat radiation sensors 4a sensitive to heat radiation W in the infrared range as well as the processing unit 4b, wherein the two heat radiation sensors 4a have different spectral heat radiation sensitivities. The first heat radiation sensor 4a can e.g. be sensitive in a range from 4 µm to 5 µm and the second in a range from 5.5 µm to 6.5 µm. The two heat radiation sensors 4a could also be designed identically, wherein an optical filter is connected upstream of each sensor. The optical filters can for example be sensitive at 4 µm and 5.5 µm each with a bandwidth of 0.1 µm around these filter frequencies.

The processing unit 4b is configured in this case for determining the temperature value TEMP on the basis of a ratio pyrometry. In other words the quotient of the two sensor signals is determined computationally, which can then be assigned to a temperature value TEMP.

Figure 3:
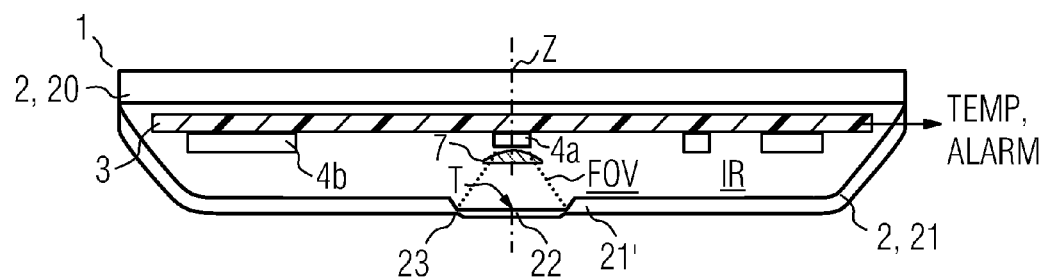
FIG. 3 shows an example of a danger detector according to a second embodiment.

FIG. 3 shows an example of a danger detector 1 according to a second embodiment. In this case an alarm cover part 22 approximately corresponding in terms of its surface to the measurement surface M is reduced in thickness in relation to the remaining part 21' of the alarm cover 22, such as by around 60% for example. In addition the alarm cover part 22 is largely decoupled via tabs 23 thermally from the remaining part 21'. In the following example according to FIG. 4 the thermal decoupling can be seen more clearly.

Furthermore according to the invention the heat radiation sensor 4a shown has a heat radiation-sensitive sensor surface F. An optical lens 7 is provided between the sensor surface F and the inner side IS of the alarm cover 21 intended for acquisition of the ambient temperature T. This serves advantageously to focus the heat radiation W leaving the alarm cover part 22 onto the sensor surface F of the heat radiation sensor 4a. The optical lens 7 is transparent in this case for light in the mid infrared range.

Figure 4:
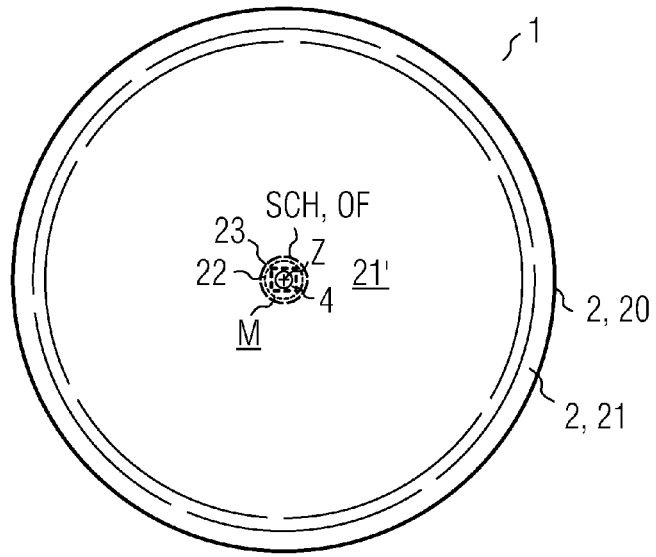
FIG. 4 shows a view of the example danger detector according to FIG. 3 from above.

FIG. 4 shows a view from above of the example danger detector 1 according to FIG. 3. As well as the rotation-symmetrical design of the alarm housing 2, it can be seen that in the central area Z, i.e. in the middle of the housing, the alarm cover part 22 is only connected by a tabs 23 with the remaining part 21' of the alarm cover 21. Slots SCH remain between the tabs 23 which can also serve as entry openings OF for flue gases or smoke particles. Through the tabs 23 an effective thermal decoupling of the alarm cover part 22 from the remaining part 21' is possible.

Figure 5:
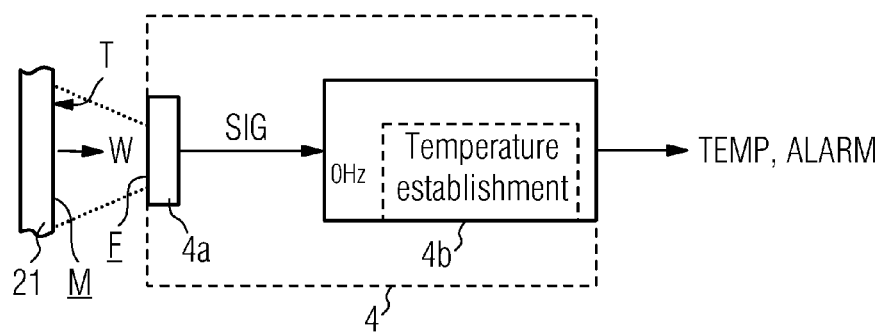
FIG. 5 shows a measurement principle of the inventive determination of a temperature value in the environment of a danger detector embodied as a point-type detector.

FIG. 5 shows a measurement principle of the inventive determination of a temperature value TEMP in the environment of a danger detector embodied as a point-type detector. According to the inventive method heat radiation W emitted by the inner side IS of the alarm cover 21 is acquired as a sensor signal SIG by means of a heat radiation sensor 4a sensitive thereto. Then the temperature value TEMP for the environment of the danger detector and/or a message ALARM are computationally determined and output from the sensor signal SIG in pyrometric ways. The determination and output is realized by a processing unit 4b, which together with the heat radiation sensor 4a can also be combined into a common component 4. The designation "0 Hz" is intended to symbolize that the steady component in the sensor signal SIG is evaluated here.

Figure 6:
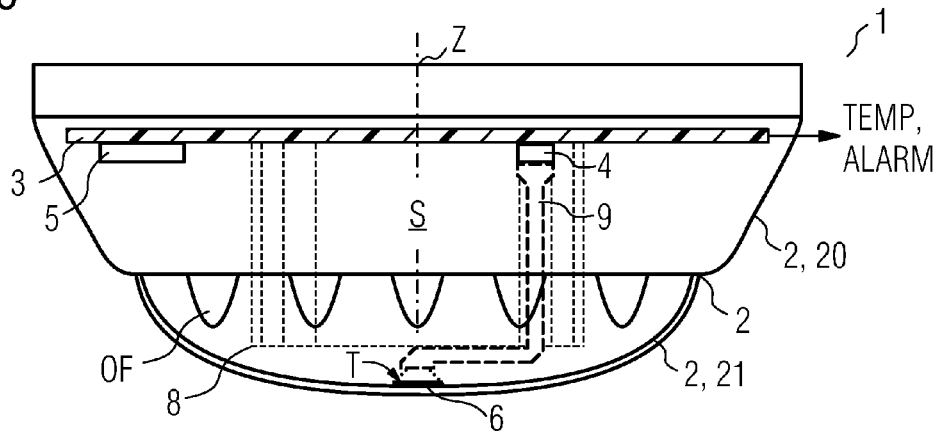
FIG. 6 shows an example for a danger detector embodied as an optical smoke detector with an internal optical measuring chamber and with an optical fiber according to one embodiment.

FIG. 6 finally shows an example for a danger detector 1 embodied as an optical smoke detector with a measurement chamber 8 lying therein and with an optical waveguide 9 according to the invention. In the present example the heat radiation sensor and the processing unit are combined into one component in the sense of a temperature sensor 4. The reference character 5 designates a higher-ranking central processing unit.

According to the invention an optical waveguide 9 is disposed between the sensor surface F of the temperature sensor 4 or between the sensor surface F of the heat radiation sensor 4a as part of the temperature sensor 4 and the inner side IS of the alarm cover 21 intended for acquiring the ambient temperature T. The latter is transparent for light in the mid-infrared range. In an advantageous manner this enables the internal area highly sensitive to scattered light, especially the scattered light center S, to be kept free of disruptive line pass-throughs. The optical fiber 9 can be snapped for example onto the measurement chamber housing, or in the case of a plastic injection-molded part, can be injection molded onto the chamber housing.

LIST OF REFERENCE CHARACTERS

1 Danger detector, flame detector, smoke detector, flue gas detector, point type detector
2 Alarm housing
3 Circuit carrier, circuit board
4 Temperature sensor
4a Heat radiation sensor, thermopile, bolometer
4b Processing unit, microcontroller
5 Further processing unit, main controller
6 Coating, adhesive foil
7 Optical lens
8 Optical measurement chamber, labyrinth
9 Optical fiber
20 Detector base
21 Alarm cover, lid, covering, cap
21' Remaining part
22 Housing part
23 Tabs
ALARM Message, alarm message
F Sensor surface
FOV Detection area
IR Inner space, housing interior
IS Inner side
M Measurement surface
OF Entry opening
S Scattered light center
SCH Slot
SIG Sensor signal
T Ambient temperature
TEMP Temperature value
W Heat radiation
Z Central position, main symmetry axis

What is claimed is:

1. A danger detector embodied as a point-type detector, the danger detector comprising:
an alarm housing with an alarm cover having a light-impermeable opaque area configured to receive environmental heat radiation via an open air ambient environment outside of the alarm cover and emit heat radiation from an inner side of the light-impermeable opaque area of the alarm cover as a function of heating of the alarm cover by the environmental heat radiation,
a non-contact heat radiation sensor disposed in the alarm housing and aligned optically with the inner side of the light-impermeable opaque area of the alarm cover, and configured to generate a sensor signal corresponding to heat radiation in the infrared range emitted by the inner side of the light-impermeable opaque area as a function of the heating of the alarm cover by the environmental heat radiation of the ambient environment outside the alarm cover,
a processing unit, and
computer instructions stored in non-transitory memory and executable by the processing unit to:
determine an ambient temperature value for an ambient temperature in the open air environment outside the alarm housing of the danger detector based on the sensor signal generated by the non-contact heat radiation sensor, and
based on the determined ambient temperature value, visibly or audibly output at least one of:
the determined ambient temperature value, or
an alarm message in response to the determined ambient temperature value exceeding a predetermined temperature comparison value.

2. The danger detector of claim 1, wherein the inner side of the alarm cover is configured as a measurement surface for non-contact acquisition of the heat radiation and wherein the measurement surface lies optically in an acquisition area of the heat radiation sensor.

3. The danger detector of claim 2, wherein the measurement surface is located at a central position of the alarm cover to provide largely direction-independent acquisition of the ambient temperature.

4. The danger detector of claim 2, wherein the measurement surface of the alarm cover comprises at least one of (a) a treated or untreated material with a predetermined surface property or (b) a material with a coating with a degree of emission for heat radiation in an infrared range of the measurement surface of at least 0.75.

5. The danger detector of claim 4, wherein the computer instructions are executable by the processing unit to determine the ambient temperature value based on the sensor signal generated by the heat radiation sensor and a stored value for the degree of emission of the measurement surface.

6. The danger detector of claim 1, wherein the danger detector comprises two non-contact heat radiation sensors sensitive for heat radiation in the infrared range, wherein the two heat radiation sensors have different spectral heat radiation sensitivities, and wherein the processing unit is configured to determine the ambient temperature value based on a ratio pyrometry.

7. The danger detector of claim 1, wherein:
the danger detector comprises one non-contact heat radiation sensor sensitive for heat radiation in the infrared range,
a switchable optical filter for two different spectral heat radiation sensitivities is connected upstream of the heat radiation sensor, and
the processing unit is configured to determine the ambient temperature value based on a ratio pyrometry.

8. The danger detector of claim 1, wherein the heat radiation sensor and the processing unit are combined into a single component as a non-contact temperature sensor.

9. The danger detector of claim 2 wherein an alarm cover part corresponding to the measurement surface has a reduced thickness as compared with a remaining part of the alarm cover.

10. The danger detector of claim 1, wherein:
the respective heat radiation sensor has a heat radiation-sensitive sensor surface,
at least one of an optical lens or an optical fiber is disposed between the sensor surface and the inner side of the alarm cover, and
the lens and the optical fiber are transparent for light in a mid-infrared range.

11. The danger detector of claim 1, wherein the heat radiation sensor comprises a thermopile or a bolometer.

12. The danger detector of claim 1, comprising a gas sensor for fire flue gases arranged in the danger detector, wherein the alarm housing comprises at least one entry opening for fire flue gases.

13. The danger detector of claim 1, comprising a scattered light arrangement disposed in or on the alarm housing for detection of smoke particles.

14. The danger detector of claim 1, wherein:
the non-contact heat radiation sensor comprises a thermopile or bolometer that is sensitive for a mid-range of infrared radiation from 3 µm to 20 µm; and a region of the alarm cover opposing the thermopile or bolometer is permeable only for the mid-range of infrared radiation from 3 μm to 20 μm.

15. A method for determining a temperature value in an open air environment outside an alarm cover of a danger detector embodied as a point-type detector, the method comprising:
   receiving, at a light-impermeable opaque area of the alarm cover, environmental heat radiation of an ambient environment outside the alarm cover,
   emitting heat radiation by an inner side of the light-impermeable opaque area of the alarm cover as a function of heating of the alarm cover by the environmental heat radiation,
   generating, by a non-contact heat radiation sensor, a sensor signal indicating a detected heat radiation emitted by the inner side of the light-impermeable opaque area of the alarm cover,
   determining the temperature value for the environment of the danger detector based at least on:
      (a) the generated sensor signal, and
      (b) a degree of emission for the heat radiation based on at least one of the material of the of the light-impermeable opaque area of the alarm cover or a surface property of the inner side of the light-impermeable opaque area of the alarm cover, and
   visibly or audibly outputting at least one of the determined temperature value or a signal indicative of the determined temperature value.

16. The method of claim 15, wherein the non-contact heat radiation sensor comprises a thermopile or a bolometer.

17. A method for determining an ambient temperature value for an open air environment outside an alarm cover of a danger detector embodied as a point-type detector, the method comprising:
   emitting heat radiation by an opaque inner side of an alarm cover as a function of heating of the alarm cover by environmental heat radiation of an ambient environment outside of the alarm cover,
   generating, by each of two heat radiation sensors, a respective sensor signal indicating a detected heat radiation emitted by the opaque inner side of the alarm cover as a function of the heating of the alarm cover by the environmental heat radiation of the ambient environment outside of the alarm cover,
   wherein the two heat radiation sensors have different spectral heat radiation sensitivities, and
   determining the ambient temperature value for the environment of the danger detector via a ratio pyrometry of the two sensor signals, and
   visibly or audibly outputting at least one of the determined ambient temperature value or a signal indicative of the determined ambient temperature value.

18. The method of claim 17, wherein each of the heat radiation sensors comprises either a thermopile or a bolometer.

19. The method of claim 17, wherein each of the two heat radiation sensors is configured to detect heat radiation emitted from the opaque area of the inner side of the alarm cover.

* * * * *